(12) United States Patent
Fujikawa

(10) Patent No.: US 6,840,341 B2
(45) Date of Patent: Jan. 11, 2005

(54) PARALLEL HYBRID VEHICLE

(75) Inventor: Masato Fujikawa, Shizuoka (JP)

(73) Assignee: JATCO Ltd, Fuji (JP)

( * ) Notice: Subject to any disclaimer, the term of this patent is extended or adjusted under 35 U.S.C. 154(b) by 0 days.

(21) Appl. No.: 10/213,064

(22) Filed: Aug. 7, 2002

(65) Prior Publication Data

US 2003/0029653 A1 Feb. 13, 2003

(30) Foreign Application Priority Data

Aug. 7, 2001 (JP) ........................................ 2001-239733

(51) Int. Cl.$^7$ ............................................... B60K 6/00
(52) U.S. Cl. ..................... 180/65.2; 180/65.3; 180/65.5
(58) Field of Search ............................. 180/65.1, 65.2, 180/65.3, 65.4, 65.5, 65.6, 65.7, 65.8; 701/22, 113; 477/12, 73, 90, 151, 181, 110, 175, 62; 475/5; 290/31, 32, 40 A, 40 C

(56) References Cited

U.S. PATENT DOCUMENTS

| | | | | |
|---|---|---|---|---|
| 5,117,931 A | * | 6/1992 | Nishida ...................... | 180/65.2 |
| 5,343,970 A | * | 9/1994 | Severinsky ................ | 180/65.2 |
| 5,651,752 A | * | 7/1997 | Wakahara et al. .......... | 477/181 |
| 5,786,640 A | * | 7/1998 | Sakai et al. ................ | 180/65.2 |
| 5,789,823 A | * | 8/1998 | Sherman .................... | 180/65.2 |
| 5,856,709 A | * | 1/1999 | Ibaraki et al. ................ | 475/5 |
| 5,865,263 A | * | 2/1999 | Yamaguchi et al. ....... | 180/65.2 |
| 6,054,776 A | | 4/2000 | Sumi | |
| 6,253,127 B1 | * | 6/2001 | Itoyama et al. .............. | 701/22 |
| 6,376,927 B1 | * | 4/2002 | Tamai et al. ................. | 290/31 |
| 6,655,485 B1 | * | 12/2003 | Ito et al. .................... | 180/65.6 |

FOREIGN PATENT DOCUMENTS

JP 10-304513 11/1998

* cited by examiner

*Primary Examiner*—Hau Phan
(74) *Attorney, Agent, or Firm*—Foley & Lardner LLP

(57) ABSTRACT

In a parallel hybrid vehicle, a controlling section controls an engine and a motor/generator, a torque from the engine and the motor/generator being transmitted to driven wheels via a transmission and a drive shaft. The controlling section comprises: an engine torque calculating section that calculates an engine torque and a torsional vibration suppression torque calculating section that calculates a torsional vibration suppression torque to suppress a torsional vibration developed on the drive shaft according to the engine torque calculated by the engine torque calculating section, the torsional vibration suppression torque calculated by the torsional vibration suppression torque calculating section being outputted from the motor/generator.

20 Claims, 14 Drawing Sheets

PARALLEL HYBRID VEHICLE

BACKGROUND OF THE INVENTION

1. Field of the Invention

The present invention relates to a parallel hybrid (electric) vehicle having an engine and a motor/generator (a motor serving also as a generator), an output torque of either one or both of these engine and motor/generator being transmitted to a transmission via a torque synthesis mechanism so that a vehicular running driving force is obtained from either one or both of the engine and motor/generator.

2. Description of the Related Art

A U.S. Pat. No. 6,054,776 issued on Apr. 25, 2000 (which corresponds to a Japanese Patent Application First Publication No. Heisei 10-304513 published on Nov. 12, 1998) exemplifies a previously proposed parallel hybrid vehicle, In the disclosed parallel hybrid vehicle, the torque synthesis mechanism constituted by a differential gear mechanism (planetary gear mechanism) is used to synthesize output torques of the engine and the motor/generator and the synthesized output torque thereat is transmitted via the transmission to driven wheels of the vehicle. A method of starting the parallel hybrid vehicle disclosed in the above-described United States Patent is such as to develop a torque from the motor/generator in such a manner that a revolution speed of the motor/generator is made completely or substantially coincident with the revolution speed of the engine while a rise in the revolution speed of the engine (also called, engine speed) is suppressed. When the revolution speed of the motor/generator is made completely coincident with or made substantially coincident with the engine speed, a lock-up clutch directly couples the engine and the motor/generator without any interruption. Thereafter, unless a vehicle velocity is reduced, the vehicular driving force from only the engine or from a combination of the engine and the motor/generator is developed.

SUMMARY OF THE INVENTION

Since, in the above-described parallel hybrid vehicle, a torque augmentation function by means of a gear ratio (sun gear/ring gear) of the planetary gear mechanism constituting the torque synthesis mechanism is provided, it is not necessary to interpose a torque converter between the engine and the transmission. However, if a fluid coupling such as a torque converter as described above is not provided in the drive system of the hybrid vehicle, a torsional vibration in the drive system would easily be developed. This may be caused by no interposition of the fluid coupling (torque converter) whereas a fluid in the fluid coupling serves to absorb the torsional vibration if the fluid coupling is interposed therebetween. When an engine torque is abruptly changed due to an abrupt change in the opening angle of the throttle valve by a vehicle driver while the planetary gear mechanism constituting the torque synthesis mechanism is being operated, the torsional vibration occurs on a drive shaft by which the driving torque is transmitted to driven road wheels.

It is, hence, an object of the present invention to provide a parallel hybrid vehicle which can suppress the torsional vibration on the drive shaft due to the abrupt change in the engine torque while the planetary gear mechanism constituting the torque synthesis mechanism is operated particularly during the start of the vehicle.

The above-described object can be achieved by providing a hybrid vehicle, comprising: an engine; a transmission; a motor/generator having both functions of an electric motor and a generator; a torque synthesis mechanism that synthesizes output torques of the engine and of the motor/generator; a lock-up clutch to directly couple the engine and the motor/generator; and a torque controlling section that controls a torque of the motor/generator in such a manner that an engine speed is maintained at a predetermined speed, with the lock-up clutch in a non-clutched state during a start of the vehicle, the torque controlling section comprising: an engine torque calculating section that calculates an engine torque; and a first torque calculating section that calculates a first torque to suppress a torsional vibration developed on a drive shaft according to the calculated engine torque.

The above-described object can also be achieved by providing hybrid vehicle comprising: an engine; a transmission; a motor/generator having both functions of an electric motor and a generator; and a controlling section that controls the engine and the motor/generator, a torque from the engine and the motor/generator being transmitted to driven wheels via a transmission and a drive shaft, the controlling section comprising: an engine torque calculating section that calculates an engine torque and a torsional vibration suppression torque calculating section that calculates a torsional vibration suppression torque to suppress a torsional vibration developed on the drive shaft according to the engine torque calculated by the engine torque calculating section, the torsional vibration suppression torque calculated by the torsional vibration suppression torque calculating section being outputted from the motor/generator.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

Figure 1:
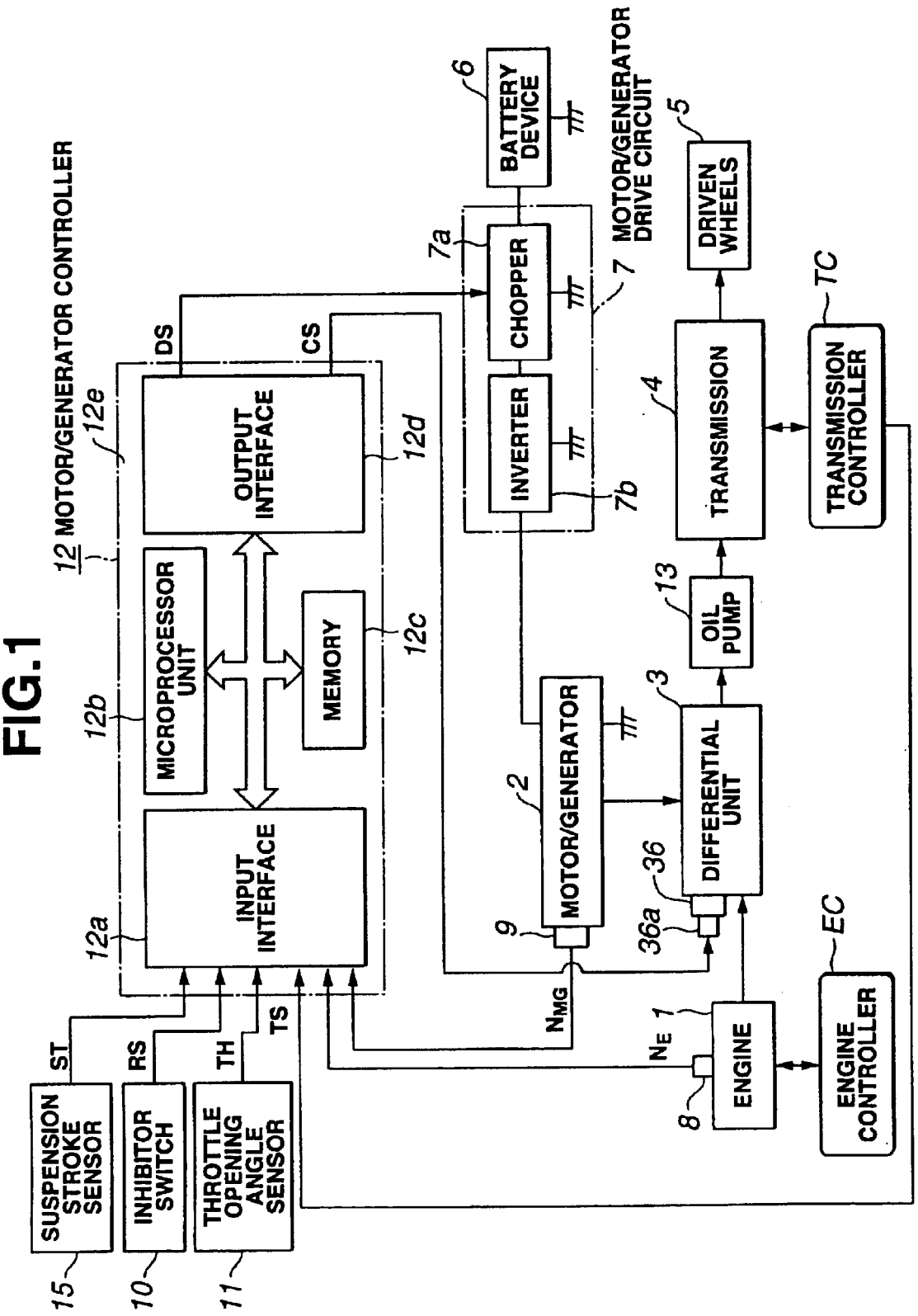
FIG. 1 is a rough configuration view of a parallel hybrid vehicle in a first preferred embodiment according to the present invention.

FIG. 1 shows a rough configuration of a hybrid vehicle in a first preferred embodiment according to the present invention. As shown in FIG. 1, output ends of an engine 1 and an AC type motor/generator 2 constituted by a three-phase synchronous motor/generator as an electrical rotary drive source functioning as both of an electric motor and a generator are connected to input ends of a differential unit (differential gear mechanism) 3 which constitutes a torque synthesis mechanism, respectively. An output end of differential unit 3 is connected to an input end of a transmission 4 in which no such a starting device as a torque converter is mounted and an output end of transmission 4 is connected to driven wheels 5 via a final reduction gear unit (not shown). It is noted that, in this embodiment, an oil pump 13 is disposed between differential unit 3 and driven wheels 5 and a fluid pressure created by oil pump 13 is used to control transmission 4 and to clutch (engage) and release lock-up clutch of differential unit 3.

Figure 2:
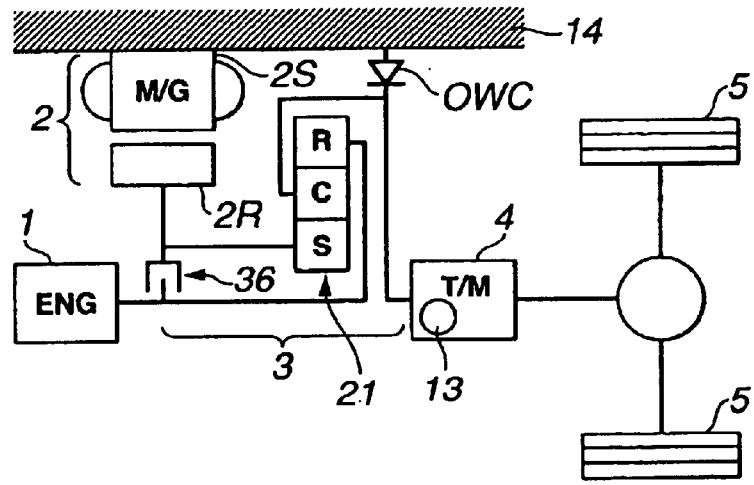
FIG. 2 is a schematic block diagram of one example of a differential unit used in the first embodiment of the parallel hybrid vehicle according to the present invention.
Figure 3A:
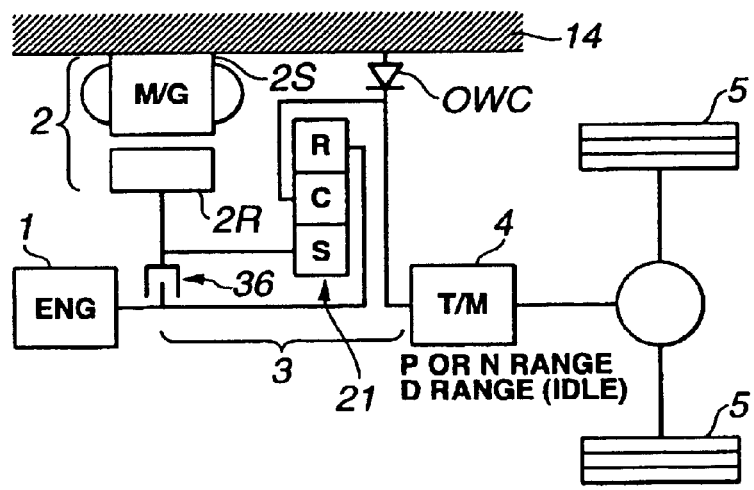
FIGS. 3A and 3B are a schematic block diagram and an alignment chart of a drive system of the parallel hybrid vehicle shown in FIG. 1 when an engine is started.
Figure 3B:
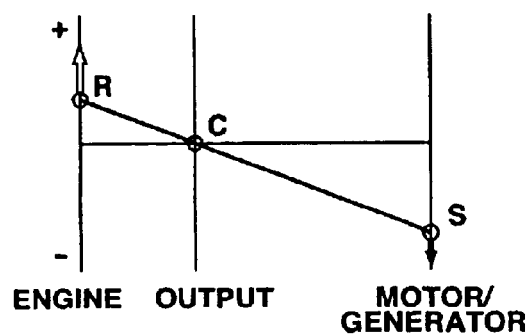

Engine 1 is controlled by means of an engine controller EC and motor/generator 2 is provided with a stator 2S and a rotor 2R, as shown in FIG. 2, and is drivingly controlled by means of a motor/generator drive circuit 7 connected to a battery device 6 constituted by a chargeable battery and a capacitor.

Motor/generator drive circuit 7 includes a chopper 7a connected to battery device 6 and an inverter 7b to convert a DC into a three-phase alternating current, inverter 7b being connected between chopper 7a and motor/generator 2 and having, for example, six IGBTs (Insulated Gate Bipolar Transistors). Motor/generator drive circuit 7 outputs a chopper signal having a duty ratio determined in accordance with an input of a duty control signal DS from a motor/generator controller 12 to chopper 7a. This inverter 7b forms gate control signals for respective IGBTs to form a three-phase alternating current driven with a frequency synchronized with a rotation of motor/generator 2 for motor/generator 2 to function as the motor when motor/generator 2 is positively rotated on the basis of rotary position detection signal of a position sensor to detect a rotational position of rotor 2R of motor/generator 2 (not shown) and functions as the generator when motor/generator 2 is rotated in a reverse direction.

It is noted that motor/generator 2 is used to drive the vehicle in the same way as engine 1 and a rotational direction toward which the vehicle is driven is defined as a positive rotation and a rotational direction which is the reverse to the positive rotation is the reverse rotation.

In addition, differential unit 3, as shown in FIG. 2, includes a planetary gear mechanism 21 as the torque synthesis mechanism. Planetary gear mechanism 21 constitutes the torque synthesis mechanism while achieving differential functions between engine 1 and motor/generator 2. Planetary gear mechanism 21 includes: a sun gear S; a plurality of pinions P (specific structure of pinions P is not shown) meshed with an outer peripheral side of sun gear S at equal angular intervals thereof; a pinion carrier C to link with each pinion P; and a ring gear R meshed with an outside of pinion P. Ring gear R of planetary gear mechanism 21 is connected to engine 1, sun gear S of planetary gear mechanism 21 is connected to rotor 2R of motor/generator 2, and pinion carrier C of planetary gear mechanism 21 is connected to the input end of transmission 4.

In addition, a lock-up clutch 36 to control linkage states of both of motor/generator 2 and engine 1 is interposed between rotor 2R of motor/generator 2 and the output end of engine 1. A one-way clutch OWC is interposed between pinion carrier C of planetary gear mechanism 21, viz., an input end of transmission 4 and a casing 14. One-way clutch OWC restricts a rotational direction of each of pinion carrier C and transmission 4 only in the positive rotational rotation and engages in the case of the reverse rotational direction to disable the reverse rotation. It is noted that although a damper may be interposed between engine 1 and ring gear R of planetary gear mechanism 21, in the first embodiment, the presence of the damper can be neglected since a resonance frequency of the damper is high.

Lock-up clutch 36, for example, is constituted by a wet type multiple-plate clutch. When a control signal CS supplied to an electromagnetic solenoid 36a of an electromagnetic valve (not shown) to supply or drain a line pressure to or from a cylinder portion of lock-up clutch 36 is at a low level, lock-up clutch 36 is controlled in a disengagement state in which engine 1 and transmission 4 are separated from each other. When control signal CS is at a high level, lock-up clutch 36 is controlled in an engagement state in which engine 1 is directly coupled to transmission 4.

Furthermore, the transmission gear ratio of transmission (T/M) 4 is controlled, for example, at any one of gear ratios of first speed, second speed, third speed, and fourth speed determined by referring to a gear control map previously set on the basis of a vehicular velocity and an opening angle TH of an engine throttle valve by means of a transmission controller TC. Transmission 4, in this embodiment, includes an automatic transmission and an engine brake purpose clutch which is capable of transmitting a reverse driving force from driven wheels 5, so-called, a torque on a road surface reaction force from driven wheels 5 toward the torque synthesis mechanism when engaged.

In addition, engine speed sensor 8 and motor/generator revolution speed sensor 9 are installed on engine 1 and motor/generator 2 to detect revolutions per time on their respective output shafts of engine 1 and motor/generator 2, respectively. An inhibitor switch 10 to output a range signal in accordance with a range selected by a select lever (not shown), a throttle opening angle sensor 11 to detect an opening angle of the engine throttle valve varied in accordance with a depression depth of an accelerator pedal of the vehicle, and a suspension stroke sensor 15 to detect a weight of the vehicle from a depth stroke of a suspension system of the vehicle are provided. Motor/generator controller 12 to control motor/generator 2 and lock-up clutch 36 receives detected values of the revolution speeds $N_E$ and $N_{M/G}$ of the revolution speed sensors 8 and 9, range signal RS of inhibitor switch 10, a detected value of the opening angle of throttle valve, and a detected value of a suspension stroke ST of suspension stroke sensor 15. In addition, motor/generator controller 12 carries out a mutual communication with at least transmission controller TC. For example, pieces of information on the gear ratio (speed range) of transmission 4 and on the clutch/release state of engine brake purpose clutch are inputted as transmission device signals TS.

Motor/generator controller 12 is constituted by a microcomputer 12e having at least input interface (circuit) 12a, an arithmetical processing unit (microprocessor unit) 12b, a memory 12c, and an output interface (circuit) 12d.

Input interface circuit 12a receives detected value $N_E$ of engine speed of engine speed sensor 8, detected value $N_{M/G}$ of the revolution speed of motor/generator 2 of motor/generator revolution speed sensor 9, range signal RS of inhibitor switch 10, detected value TH of throttle valve opening angle from throttle valve opening angle sensor 11, the suspension stroke quantity ST of suspension stroke sensor 15, and a transmission signal TS from transmission controller TC.

Arithmetic processing unit (microprocessor) 12b is activated in response to a turned on of a predetermined power supply when, for example, a key switch (not shown) is turned on. Arithmetic processing unit 12b, at first, is initialized so that a drive duty control signal MS and a power supply duty control signal GS to motor/generator 2 are turned off and clutch control signal CS to be supplied to lock-up clutch 36 is also turned off. Thereafter, when the vehicle is at least started, motor/generator 2 and lock-up clutch 36 are controlled on the basis of detected value of engine speed $N_E$, the detected value $N_{M/G}$ of the revolution speed of motor/generator 2, range signal RS, and detected value (opening angle) TH of the engine throttle valve. In details, arithmetic processing (Microprocessor unit 12b carries out an, so-called, idling stop in which engine 1 is stopped during a stop of the vehicle, in the first embodiment.

Memory 12c previously stores a processing program required for the arithmetical processing of arithmetic processing unit 12b and stores various kinds of programs required during a calculation process of arithmetic processing unit 12b. Memory 12c generally includes a RAM (Random Access Memory) and a ROM (Read Only Memory).

Output interface circuit 12d supplies drive duty control signal MS, power generation duty control signal GS, and clutch control signal GS to motor/generator drive circuit 7 and electromagnetic solenoid 36a. It is possible to apply the braking force to the vehicle by utilizing a counter electromotive force in motor/generator 2. A braking torque augmentation control for motor/generator 2 is carried out in such a way that when motor/generator 2 functions as the generator, the duty ratio of duty control signal DS supplied to chopper 7a of motor/generator drive circuit 7 is increased so that a counter electromotive force developed is increased to augment the braking torque. In addition, when motor/generator 2 functions as the electric motor, the duty ratio of duty control signal DS is reduced so that the drive torque is reduced and the brake torque is, in turn, increased. In addition, the braking torque reduction control of motor/generator 2 is carried out in the following. When motor/generator 2 functions as the generator, the duty ratio of duty control signal DS is reduced so that the developed counter electromotive force is reduced and the braking torque is reduced. When motor/generator 2 functions as the electric motor, the duty ratio of duty control signal DS is enlarged so that the drive torque is increased and the brake torque is reduced.

Next, various operating states of engine 1 and motor/generator 2 carried out in the motor/generator controller 12 in accordance with a vehicular running state, a state of battery device 6, and a vehicular operating state will be described below.

As described above, engine 1 is stopped during the stop of the vehicle in case of the engine idling stop function provided in the vehicle of the first embodiment.

Then, suppose that a manipulation of select lever causes a running speed range including a drive range D to be selected. Or suppose that even if the manipulation of select lever causes a parking range P or neutral range N to be selected, the opening angle of throttle valve TH is in excess of "0" (exceeding zero angle). In either of these cases, if motor/generator 2 is reversely rotated at a predetermined speed (required is the engine speed and torque), pinion carrier C cannot rotate reversely by means of one-way clutch OWC. Hence, engine 1 is, in turn, rotated in the positive direction. In this state, a fuel is injected so that engine 1 is started. In addition, along with the start of engine 1, the drive of oil pump 13 is started. It is possible to rotate positively motor/generator 2 to develop the torque in the positive direction and to rotationally drive engine 1, with engine 1 and motor/generator 2 directly coupled together.

It is possible to rotate positively motor/generator 2 to develop the torque in the positive direction and to rotationally drive motor/generator 2, with engine 1 and motor/generator 2 directly coupled.

Figure 4A:
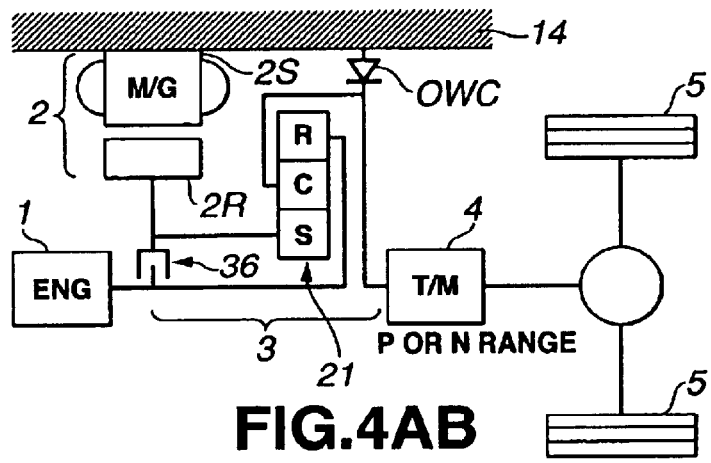
FIGS. 4AA and 4AB are a schematic block diagram and an alignment chart of the drive system of the parallel hybrid vehicle when a battery device of the hybrid vehicle shown in FIG. 1 is charged.
Figure 4A:
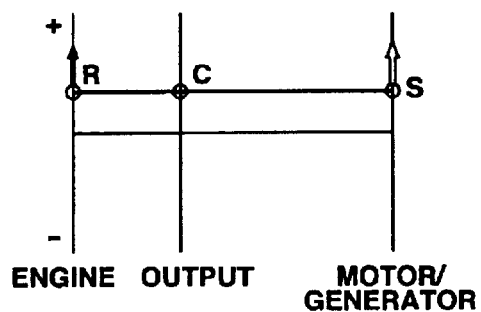
Figure 4B:
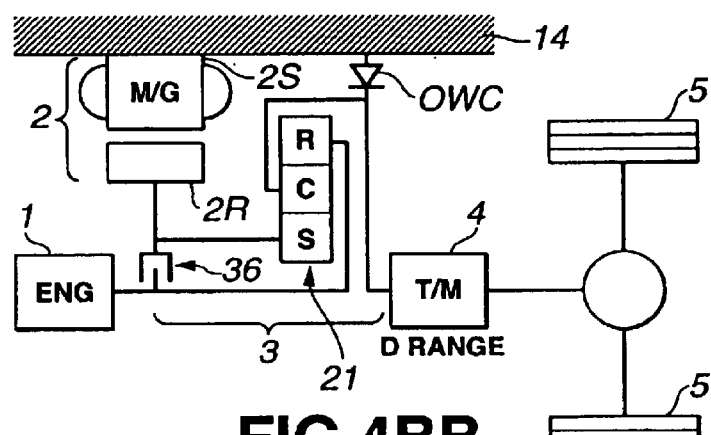
FIGS. 4BA and 4BB are a schematic block diagram and an alignment chart of the drive system of the parallel hybrid vehicle when the battery device of the hybrid vehicle shown in FIG. 1 is charged.
Figure 4B:
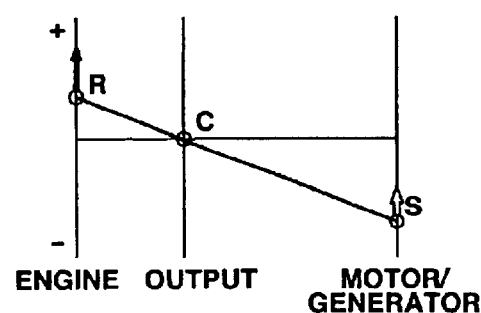
Figure 5A:
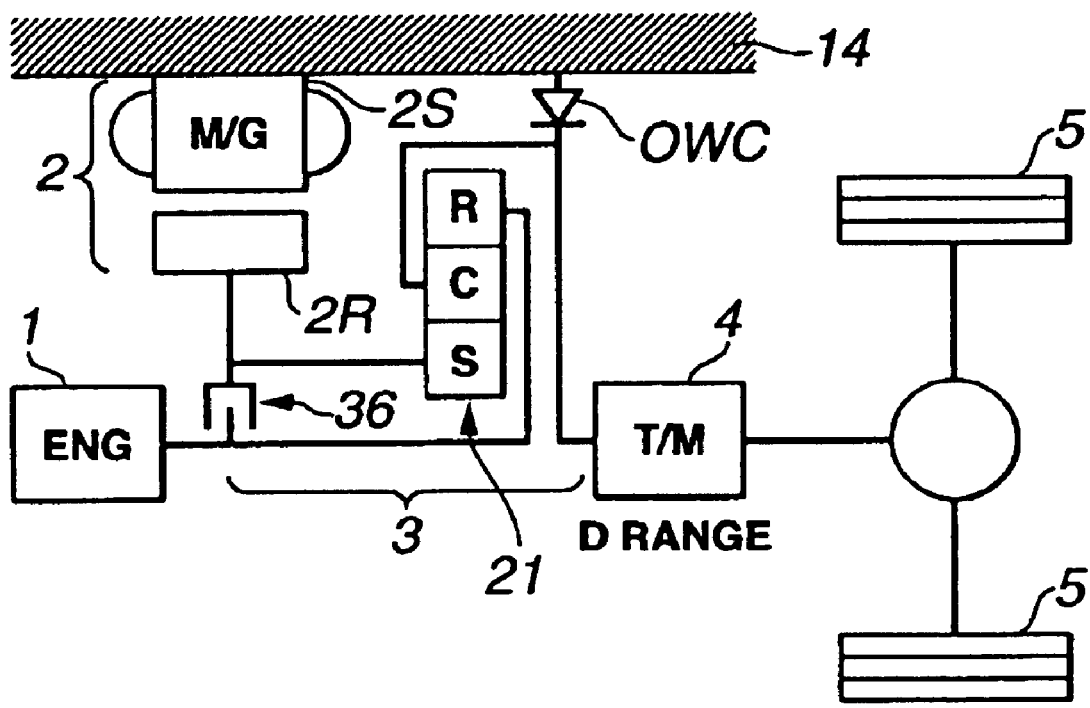
FIGS. 5A and 5B are a schematic block diagram and an alignment chart of the drive system of the parallel hybrid vehicle when the vehicle shown in FIG. 1 is started and accelerated.
Figure 5B:
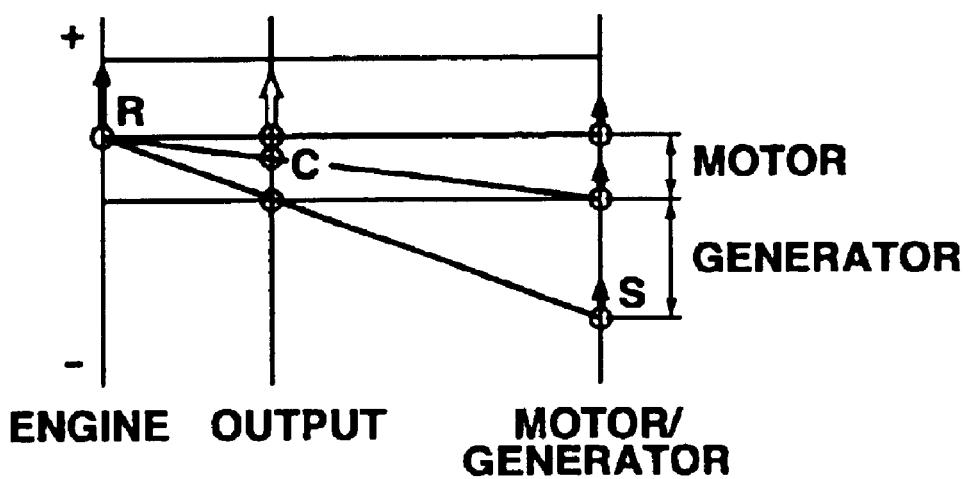

In this way, in a case where it is not necessary to start the vehicle after engine 1 is started, that is to say, in a case where a foot brake is depressed deeply after engine 1 is started, a power supply accumulation (charging) is carried out in a battery device 6 such as a battery utilizing a rotary drive force of engine 1. That is to say, a power generation is carried out using motor/generator 2 as the generator. At this time, in a case where the speed range selected by the select lever is at parking range P or neutral range N, input end and output end of transmission 4 are not connected with each other. Hence, as shown in FIGS. 4AA and 4AB, lock-up clutch 36 directly couples engine 1 with motor/generator 2. While engine 1 positively rotates motor/generator 2 to apply the positive torque thereto so that the power generation is carried out. On the other hand, when the running range including drive range D is selected by the select lever, the input end and output end of transmission 4 are connected. Hence, as shown in FIGS. 4BA and 4BB, the positive torque is applied to ring gear R to function motor/generator 2 as the generator while engine 1 reversely revolving motor/generator 2 utilizing pinion carrier C not revolving in the reverse direction due to the inhibit of the reverse rotation by means of one-way clutch OWC. Motor/generator 2, at this time, carries out the power generation.

In addition, when the running range including drive range D is selected and an accelerator pedal is depressed, the positive directional torque is developed to gradually rotate motor/generator 2 while maintaining engine speed at a target engine speed $N_{EP}$ preset to a large value as the opening angle of throttle valve becomes large under a released state of lock-up clutch 36 in order to start the vehicle. Consequently, the positive torque is applied to pinion carrier C to start and accelerate the vehicle. At this time, when motor/generator 2 is reversely rotated, motor/generator 2 functions as power generator and when motor/generator 2 is positively rotated, motor/generator 2 functions as the motor.

Figure 6A:
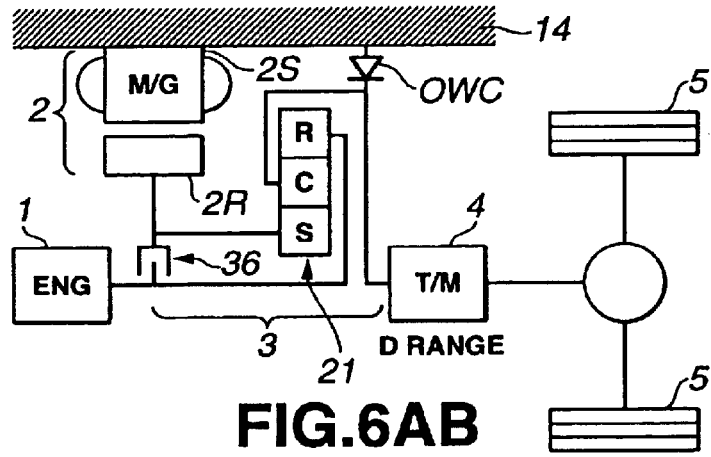
FIGS. 6AA and 6AB are a schematic block diagrams and an alignment chart of the drive system of the parallel hybrid vehicle when the vehicle shown in FIG. 1 is running.
Figure 6A:
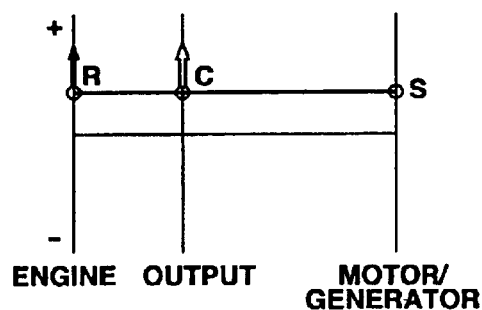
Figure 6B:
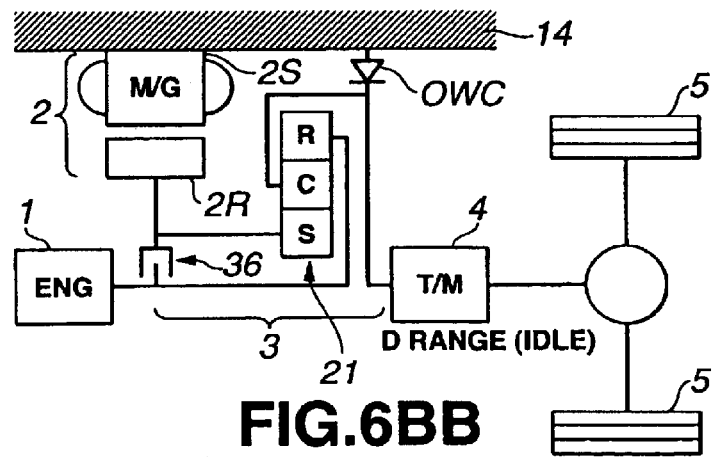
FIGS. 6BA and 6BB are a schematic block diagram and an alignment chart of the drive system of the parallel hybrid vehicle when the vehicle shown in FIG. 1 is running.
Figure 6B:
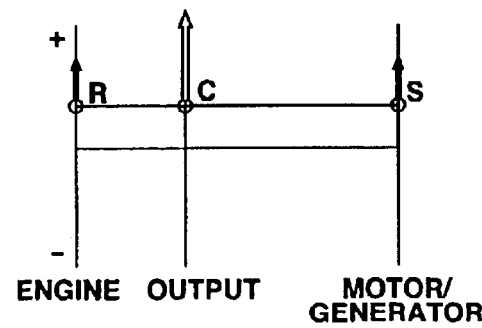

At a later time, when revolution speed of motor/generator 2 is made coincident with or substantially coincident with an engine speed at which a predetermined engine speed, viz., target engine speed $N_{EP}$ is maintained, lock-up clutch 36 is engaged so that engine 1 is directly coupled to motor/generator 2 to run the vehicle. For example, under such situations that the vehicle is running at a vehicular speed equal to or higher than a certain speed, a depression depth of the accelerator pedal is large (deep), the speed reduction ratio within transmission 4 is large, or a charge quantity of battery device 6 is small, it is disadvantageous of using motor/generator 2 as the motor. Hence, as shown in FIGS. 6AA and 6AB, motor/generator 2 does not develop the torque but the torque is developed only from engine 1 under a, so-called, free run state of motor/generator 2 and the vehicle runs in this state. On the other hand, under such running situations that the vehicular velocity is low, the depression depth of the accelerator pedal is small (shallow), a speed reducing ratio within transmission 4 is small, the charge quantity of battery device 6 is much, no disadvantage of using motor/generator 2 as the motor is raised. Hence, as shown in FIGS. 6BA and 6BB, motor/generator 2 is positively rotated to develop the positive directional torque and to assist performance of engine 1.

Figure 7A:
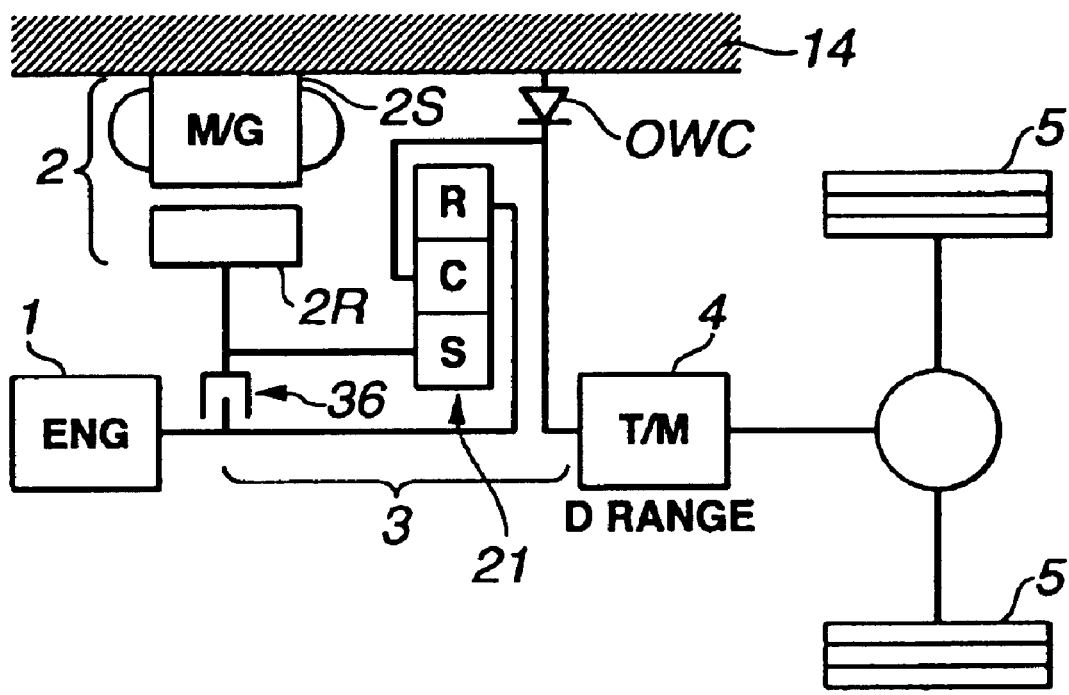
FIGS. 7A and 7B are a schematic block diagram and an alignment chart of the drive system of the parallel hybrid vehicle when a motor/generator of the vehicle shown in FIG. 1 is regenerated.
Figure 7B:
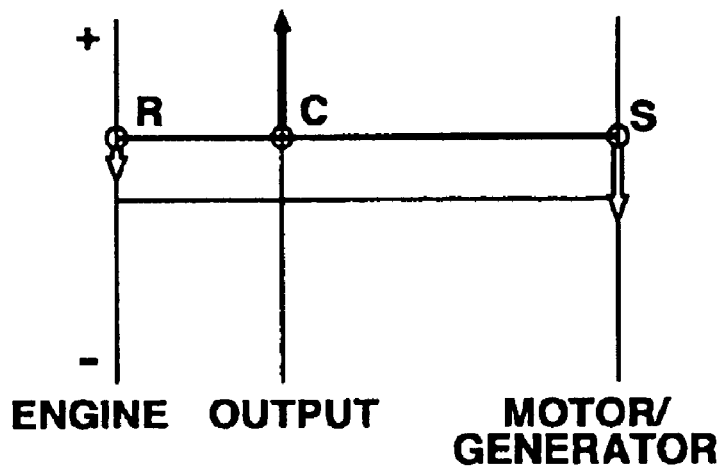

On the contrary to such a vehicular acceleration running state as described above, under such a vehicular deceleration state that a, so-called, engine brake is expected to be effected. Motor/generator 2 is used as the generator with lock-up clutch 36 engaged, as shown in FIGS. 7A and 7B, develops a negative directional torque for a road surface reaction force torque to strengthen a braking force in place of the engine brake that engine 1 naturally has or in addition to the engine brake.

Figure 8A:
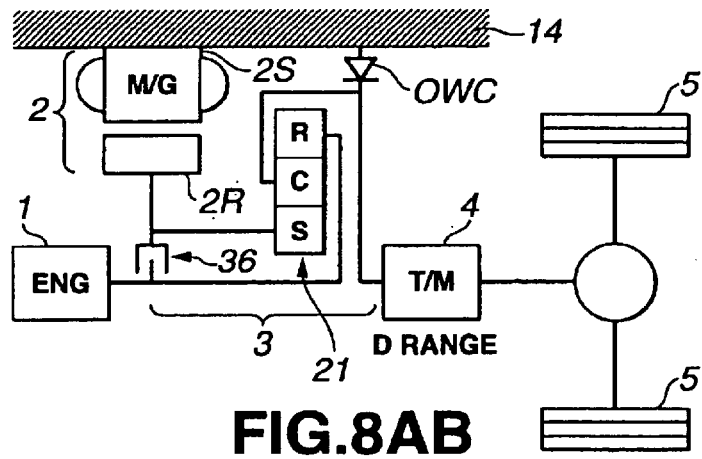
FIGS. 8AA and 8AB are a schematic block diagram and an alignment chart of the drive system of the parallel hybrid vehicle when the vehicle shown in FIG. 1 is in a creep run.
Figure 8A:
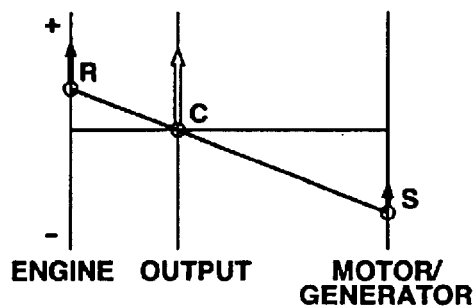
Figure 8B:
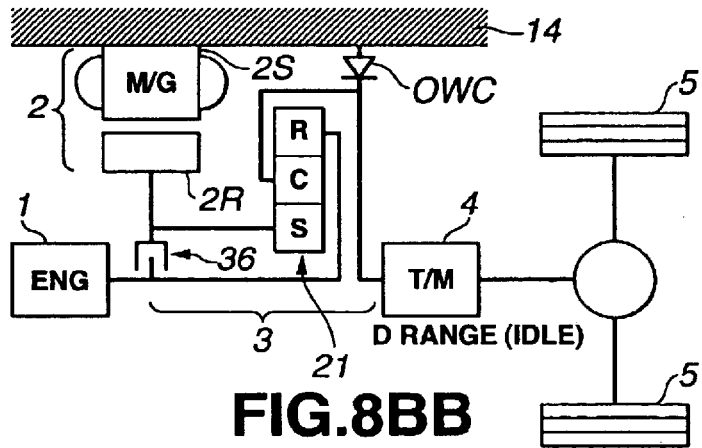
FIGS. 8BA and 8BB are a schematic block diagram and an alignment chart of the drive system of the parallel hybrid vehicle when the vehicle shown in FIG. 1 is in the creep run.
Figure 8B:
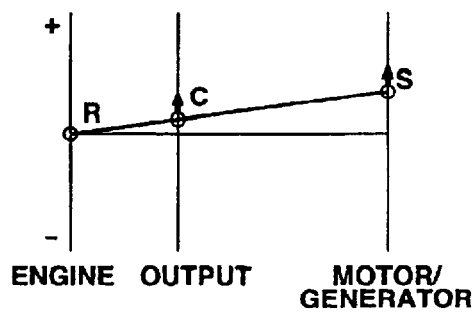

Other than such general running situations as described above, in the first embodiment, a creep running mode in the running range including drive range D is set. For example, under a situation immediately after engine 1 is started, the positive torque is developed from engine 1 which is in the idling state while motor/generator 2 develops the positive torque, as shown in FIGS. 8AA and 8AB, the synthesized torque of both engine 1 and motor/generator 2 causes the vehicle to perform a creep run. When engine 1 is not started, motor/generator 2 may positively rotate to develop the positive directional torque so that the vehicle is enabled to perform the creep run, as shown in FIGS. 8BA and 8BB.

Figure 9A:
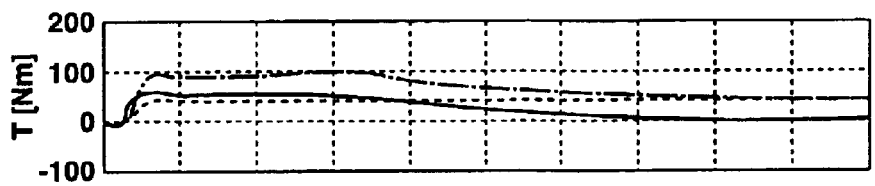
FIGS. 9A, 9B, 9C, 9D, 9E, and 9F are timing charts representing operating states of the engine and motor/generator when the parallel hybrid vehicle shown in FIG. 1 is started and accelerated.
Figure 9B:
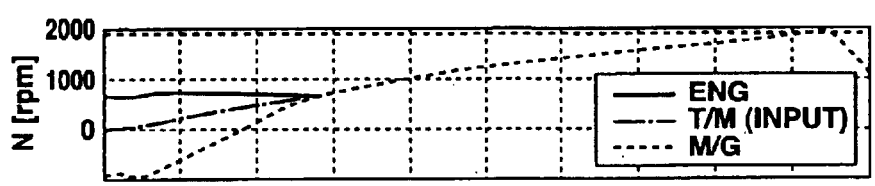
Figure 9C:
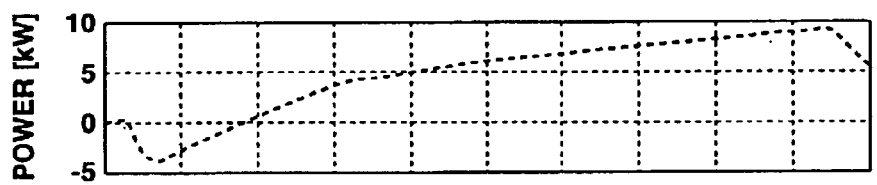
Figure 9D:
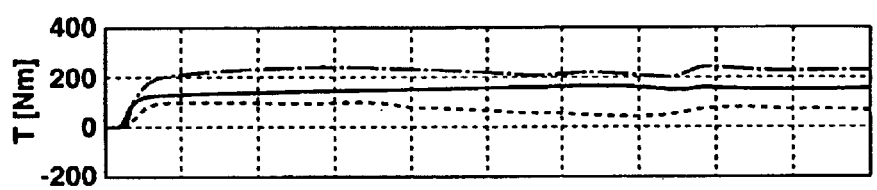
Figure 9E:
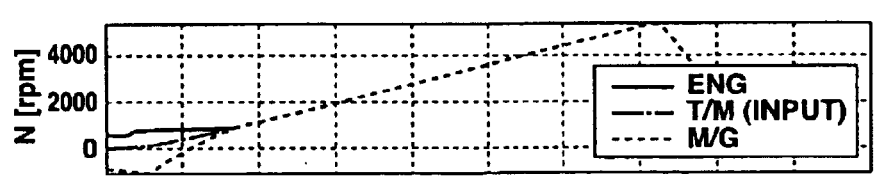
Figure 9F:
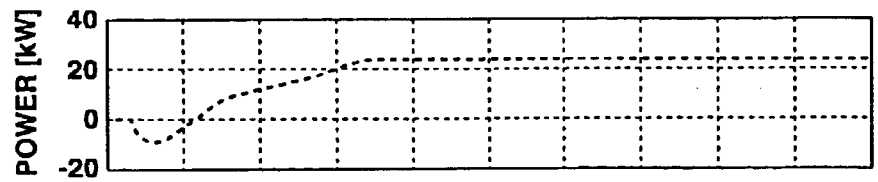

FIGS. 9A through 9C show timing charts of torque, revolution speeds, power of the hybrid vehicle when the parallel hybrid vehicle shown in FIG. 1 is started under such a state as an extremely slight (shallow) depression on the accelerator pedal. In such a state as described with reference to FIGS. 9A through 9C, it is not necessary to accelerate remarkably the vehicle, for example, by high-speed revolutions of motor/generator 2. Hence, while motor/generator 2 in the reverse rotation state immediately after engine 1 is started is positively rotated at a slow pace so that a positive directional constant torque is developed. Thereafter, after the direct coupling between engine 1 and motor/generator 2, the output torque of engine 1 is further reduced so that the vehicle can be started and can be accelerated substantially only by motor/generator 2. On the contrary, FIGS. 9D through 9F show timing charts of the torque, revolution speeds, and the power of the vehicle when the vehicle is started in a state in which the accelerator pedal is fully depressed.

A high-speed revolution of motor/generator 2 results in a reduction of a motor torque. In many cases, this is not sufficient to accelerate the vehicle. Hence, motor/generator 2 in the reverse rotation state immediately after engine 1 is started is speedily rotated in the positive direction, the direct coupling between engine 1 and motor/generator 2 is made earlier. After the direct coupling, the output torques of engine 1 and of motor/generator 2 are utilized to start and accelerate the vehicle so that the vehicular velocity reaches speedily to a high velocity value.

Figure 10:
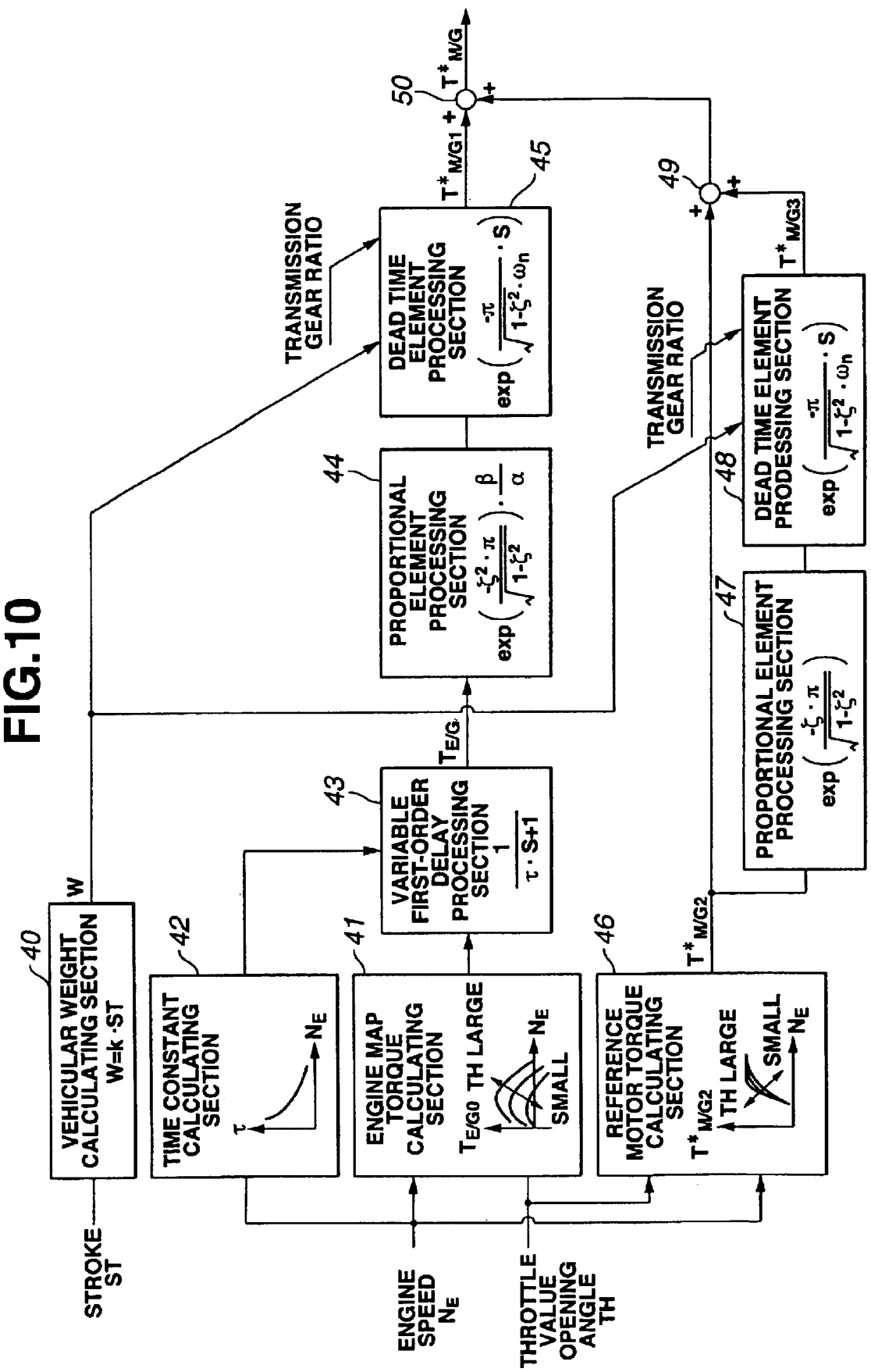
FIG. 10 is a functional block diagram of an arithmetic processing content of a motor/generator controller in the first embodiment according to the present invention.

Such a series of controls over motor/generator 2 as described above is to be executed mainly in accordance with an acceleration that a vehicular driver has demanded. In the parallel hybrid vehicle of this embodiment, a target motor/generator torque is obtained from the opening angle of the throttle valve representing an intention of the vehicular driver and from the actual speed of engine 1 and a rotation state, viz., the torque of motor/generator 2 is controlled to achieve the target motor/generator torque. In the first embodiment, such a control as described in a block diagram of FIG. 10 is executed. The control shown in FIG. 10 is constructed by means of a series of arithmetic processes executed by arithmetic processing unit 12b within motor/generator controller 12.

That is to say, as shown in FIG. 10, arithmetic processing unit 12b includes: a vehicular weight calculating section 40 that calculates a weight W of the vehicle on the basis of suspension stroke ST detected by suspension stroke sensor 15; an engine map torque calculating section 41 that calculates an engine map torque $T_{E/G0}$ from engine speed $N_E$ of engine speed sensor 8 and throttle opening angle TH of throttle opening sensor 11; a time constant calculating section 42 that calculates a time constant τ calculated by engine map torque calculating section 41 for engine map torque $T_{E/G0}$ calculated by engine torque map calculating section 41 to calculate a present engine torque $T_{E/G}$ to be inputted to the vehicular drive system; a variable first-order delay processing section 43 that provides a variable first-order delay processing using time constant τ calculated by time constant calculating section 42 for engine map torque $T_{E/G0}$ calculated by engine map torque calculating section 41 to calculate a present engine torque $T_{E/G}$ inputted into a drive system of the vehicle: a proportional element processing section 44 that executes a proportional element process for the present engine torque $T_{E/G}$ calculated by the variable first-order delay processing section 43; a dead time element processing section 45 that executes a dead time element process using the vehicular weight W calculated by weight calculating section 40 and gear ratio inputted from transmission controller TC for a value calculated by proportional element processing section 44 to calculate a first motor/generator torque $T^*_{M/G1}$; a reference motor/generator torque calculating section 46 that calculates a reference motor/generator torque $T^*_{M/G2}$ corresponding to a second motor/generator torque on the basis of engine speed NE and opening angle TH of the throttle valve; a proportional element processing section 47 that executes the proportional element process for reference motor/generator torque $T^*_{M/G2}$ calculated by reference motor/generator torque calculating section 46; a dead time element processing section 48 that executes a dead time element process using the vehicular weight W calculated by weight calculating section 40 and gear ratio inputted from transmission controller TC for a value calculated by proportional element processing section 47 to calculate a third motor/generator torque $T^*_{M/G3}$; an adder 49 that adds third motor/generator torque $T^*_{M/G3}$ calculated by the dead time element processing section 48 to second motor/generator torque $T^*_{M/G2}$ calculated by reference motor/generator torque calculating section; and an adder 50 that adds the value added by adder 49 to first motor/generator torque $T^*_{M/G1}$ calculated by dead time element processing section 45 to calculate and output a target motor/generator torque $T^*_{M/G}$.

Weight calculating section 40 calculates the weight of the vehicle by multiplying suspension stroke variable ST detected by suspension stroke sensor 15 by a predetermined coefficient k (W=k·ST).

Figure 11:
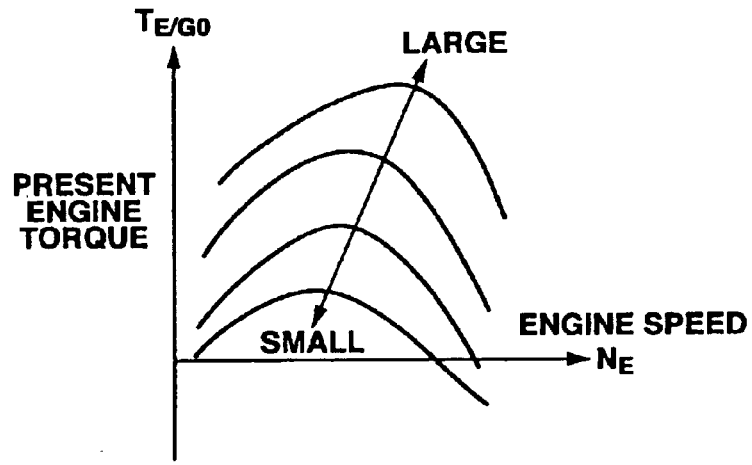
FIG. 11 is a control map used in the first embodiment of the hybrid vehicle according to the present invention.

Engine map torque calculating section 41 calculates engine map torque $T_{E/G0}$ in accordance with an engine torque map, for example, shown in FIG. 11 with a lateral axis as engine speed $N_E$, a longitudinal axis as engine map torque $T_{E/G0}$, an opening angle TH of the engine throttle valve as a parameter.

Figure 12:
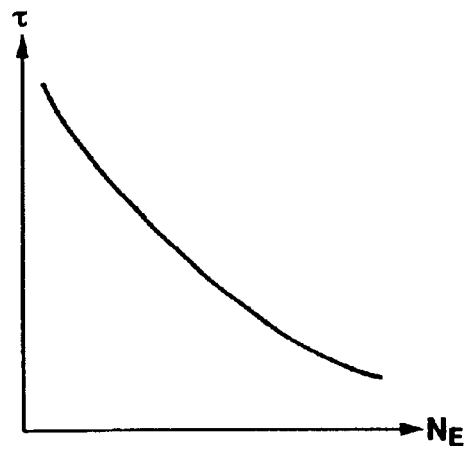
FIG. 12 is a control map used in the first embodiment of the hybrid vehicle according to the present invention.
Figure 13:
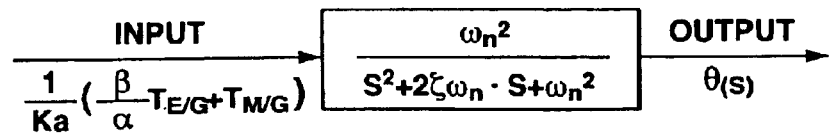
FIG. 13 is a functional block diagram of the drive system of the parallel hybrid vehicle shown in FIG. 1.

Time constant calculating section 42 calculates and sets time constant τ in accordance with a control map shown in FIG. 12. As shown in FIG. 12, an engine speed $N_E$ becomes increased, time constant τ becomes decreased in a convex curve form since a response characteristic is more favorable as engine speed $N_E$ becomes higher.

Variable first-order delay processing section 43 uses time constant τ calculated by time constant calculating section 42 to execute the first-order delay process for engine map torque $T_{E/G0}$ calculated by engine map torque calculating section 41 to calculate present engine torque $T_{E/G}$.

On the other hand, proportional element and dead time element are set in proportional element processing section 44 and dead time element processing section 45. Suppose that engine torque is $T_{E/G}$, the engine inertia (first rotary member inertia) is $I_{E/G}$, the torque of motor/generator is $T_{M/G}$, the inertia of motor/generator 2 (third rotary member inertia) is $I_{M/G}$, the inertia of the pinion carrier, namely, transmission 4 is $I_{CRR}$, a spring constant of the driver shaft is K, the damping constant of the drive shaft is C, and an equivalent inertia of the vehicle body on the drive shaft (=a vehicular weight (W)×tire dynamic radius² (r²)) is Iw, and the gear ratio of planetary gear mechanism constituting the torque synthesis mechanism is α. At this time, the following equation (1) is established on a torsional angle θd of the drive shaft.

$$Ia \cdot \theta''d + Ca \cdot \theta'd + Ka \cdot \theta d = (\beta/\alpha) \cdot T_{E/G} + T_{M/G} = Ka\{(1/Ka) \cdot (\beta/\alpha) \cdot T_{E/G} + T_{M/G}\} \quad (1).$$

Wherein $\theta''d=d^2\theta/dt$, $\theta'd=d\theta/dt$, and $Ia=R\{(1+\alpha)/\alpha \cdot \beta \cdot I_{E/G}+(\beta+\alpha^2)/\alpha(1+\alpha) \cdot I_{CRR}\}$, $Ca=C\{R \cdot (1+\alpha)/\alpha \cdot \beta \cdot I_{E/G}/I_W+(\beta+\alpha^2)/\alpha(1+\alpha) \cdot (R \cdot I_{CRR}/I_W+1/R)\}$, $Ka=K\{R \cdot (1+\alpha)/\alpha \cdot \beta \cdot I_{E/G}/I_W+(\beta+\alpha^2)/\alpha(1+\alpha) \cdot (R \cdot I_{CRR}/I_W+1/R)\}$ and $\beta=I_{M/G}/I_{E/G}$.

Since above-described equation (1) is a second-order delay system, a right side of equation (1) is expressed by a general formula as shown in FIG. 12. In equation (1), specific angular (vibration) frequency ωn and damping coefficient (damping factor) ξ are expressed in the following equations (2) and (3).

$$\omega n = \sqrt{Ka/Ia} \quad (2)$$

and $$\xi = 1/2 \cdot Ca/\sqrt{(Ia \cdot Ka)} \quad (3).$$

Suppose that, for example, engine torque $T_{E/G}$ is abruptly changed. At this time, the drive shaft of the drive system of the vehicle is vibrated at a specific period λ of the drive system expressed from the following equation (4).

$$\lambda = 2\pi/\{\sqrt{(1-\xi^2)} \cdot \omega n\} \quad (4).$$

In order to compensate for a vibration on the drive shaft caused by engine torque $T_{E/G}$ using motor/generator torque $T_{M/G}$, another vibration having the same amplitude as the vibration whose period is expressed by equation of (4) but having a delay of half period as the specific period λ of the drive system may be developed in a pseudo manner according to a variation of motor/generator torque $T_{M/G}$. It is noted that the vibration of drive shaft due to engine torque $T_{E/G}$ is damped by $\exp(-\xi\pi/(1-\xi^2)^{1/2})$ after a half period, i.e., λ/2 period. Hence, if motor/generator torque $T^*_{M/G1}$ expressed by the following equation (5) is developed at motor/generator 2, it becomes possible to compensate for the torsional vibration of the drive shaft due to the abrupt change in engine torque $T_{E/G}$ through the interference.

$$T^*_{M/G1} = \exp(-\xi\pi/\sqrt{(1-\xi^2)}) \cdot \beta/\alpha \cdot T_{E/G}(t-\pi/(\sqrt{(1-\xi^2)} \cdot \omega n)) \quad (5).$$

In the equation (5), a coefficient portion multiplied by engine torque $T_{E/G}$ is constituted by proportional element processing section 44. A portion of the function $T_{E/G(t)}$ of the engine torque related to time is delayed by half of the specific vibration period expressed by equation (5) constitutes dead time element processing section 45. In addition, first motor/generator torque $T^*_{M/G1}$ expressed by equation (5) corresponds to a first torque related to the present invention and described in the claims. On the other hand, reference motor torque calculating section 46 calculates reference motor torque $T^*_{M/G2}$ on the basis of opening angle TH of the throttle valve detected by the throttle opening angle sensor 11 and engine speed $N_E$ detected by engine speed sensor 8. The control map is a two-dimensional map to calculate and set reference motor/generator torque $T^*_{M/G2}$, with the opening angle TH of engine throttle valve as a parameter.

One of the features on this map lies in a point in which reference motor/generator torque $T^*_{M/G2}$ is zeroed in a region equal to or below first predetermined engine speed $N_{E0}$ preset to an engine idling speed. This is ① in a region in which engine speed $N_E$ is lower than an ordinary engine idling speed, engine torque is not stabled and, in this state, motor/generator torque is further applied to engine 1 so as to prevent engine stall from being developed; ② the engine speed $N_E$ is quickly raised up to target engine speed; ③ when motor/generator speed $N_{M/G}$ is made coincident with or substantially coincident with engine speed $N_E$ in a region in which engine speed $N_E$ is lower than engine idling speed, engine 1 is directly coupled to motor/generator 2. Thereafter, if the positive directional torque of, for example, motor/generator 2 is nullified, it becomes necessary to accelerate the vehicle at a region lower than idling speed. Consequently, the engine stalling occurs and a vehicular motion becomes unstable. The above-described setting of the zeroed reference motor/generator torque $T^*_{M/G2}$ in the region equal to or below first predetermined engine speed $N_{E0}$ can prevent the above-described engine stalling from occurring.

Figure 14:
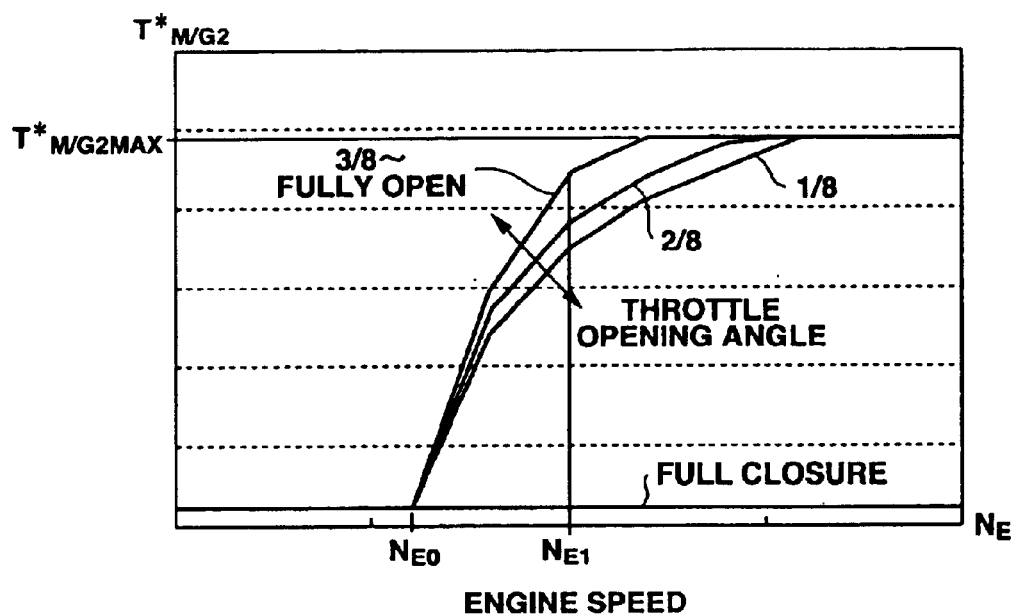
FIG. 14 is a control map used in the first embodiment of the parallel hybrid vehicle shown in FIG. 1.

In addition, since in a region in which the engine speed is equal to or above first predetermined engine speed $N_{E0}$ but is equal to or lower than second predetermined engine speed $N_{E1}$ which is larger than first predetermined speed $N_{E1}$, reference motor/generator torque $T^*_{M/G2}$ is gradually increased along with the increase in engine speed $N_E$. Hence, it becomes possible to accelerate and start the vehicle with motor/generator torque without remarkable increase in engine speed $N_E$. Actually, reference motor/generator torque $T^*_{M/G2}$ is set to become smaller than the torque developed by engine 1. This is because the motor/generator torque is amplified by the gear ratio in the planetary gear mechanism constituting the torque synthesis mechanism. It becomes possible to start and accelerate the vehicle with a small motor/generator torque. This is associated with the map in which as the opening angle of the throttle valve becomes wider (larger), reference motor/generator torque $T^*_{N/G2}$ becomes larger, as shown in FIG. 14. In FIG. 14, ⅔ of throttle opening angle is wider than ⅛ thereof and ⅜ thereof is wider than ⅔ thereof. Reference motor/generator torque $T^*_{M/G2}$ becomes large as opening angle TH of the throttle valve becomes large for the same engine speed $N_E$, namely, for the same engine torque. For example, this means that motor/generator rotating in the reverse direction after the engine is started is quickly rotated in the positive direction. Since as the reference speed of motor/generator 2 becomes higher, the torque becomes smaller when motor/generator is used as the motor. In the actual practice, reference motor/generator torque $T^*_{M/G2}$ becomes uneasy to be achieved. On the other hand, since motor/generator speed $N_{M/G}$ is made coincident with or substantially coincident with engine speed $N_E$. Lock-up clutch directly couples engine 1 to motor/generator 2 at a relatively early timing. Therefore, the torque required to accelerate the vehicle is rested on engine. Consequently, it becomes possible to prevent motor/generator from developing an unnecessary torque. On the contrary, as the opening angle TH of the throttle valve becomes smaller, reference motor/generator torque $T^*_{M/G2}$ becomes small. For example, motor/generator rotating in the reverse direction after engine 1 is not readily rotated in the positive direction. The revolution speed of motor/generator $N_{M/G}$ tends to be uneasy to be coincident with engine speed $N_E$. Hence, the direct coupling between engine 1 and motor/generator 2 is not easily achieved. This means that during the start and acceleration for the driver not requiring a large acceleration force, the vehicle is accelerated at a relatively slow pace only with a substantial motor/generator torque (actually the synthesis torque of the torque in the idling state of engine 1). A general engine characteristic has a feature that the torque is not stable in a low revolution. It becomes possible to accelerate slowly by compensating a demerit described above.

On the other hand, in a region (refer to FIG. 14) in which engine speed $N_E$ is equal to or slightly higher than second predetermined engine speed $N_{E1}$, engine torque becomes equal to reference motor/generator torque $T^*_{M/G2}$. Hence, in this region, motor/generator revolution speed $N_{M/G}$ is set to be coincident with or substantially coincident with engine speed $N_E$, it is possible to accelerate the vehicle with both of engine and motor/generator being directly coupled. In a region in which engine speed $N_E$ becomes higher than second predetermined engine speed $N_{E1}$, reference motor/generator torque $T^*_{M/G2}$ is set to become coincident with or become substantially coincident with the engine torque, reference motor/generator torque $T^*_{M/G2}$ falling the region up to an upper limit value $T^*_{M/G2MAX}$. In other words, at a stage in which engine speed $N_E$ becomes in excess of second predetermined value $N_{E1}$, motor/generator torque has reached to reference motor/generator torque $T^*_{M/G2}$. At this time, motor/generator speed $N_{M/G}$ is approximately or completely coincident with engine speed $N_E$. In this state, when the engagement between engine 1 and motor/generator 2 by means of lock-up clutch 36 is made, it is not necessary to make coincident with both torques. For example, the torque of motor/generator is gradually zeroed so that the vehicular acceleration only by means of engine 1 without giving a driver's unpleasant feeling.

In addition, as already appreciated, an incremental gradient of reference motor/generator torque $T^*_{M/G2}$ for engine speed $N_E$ corresponds to a gain of reference motor/generator torque $T^*_{M/G2}$. Then, in this embodiment, the incremental gradient is classified into several stages. As engine speed $N_E$ becomes increased, the gradient becomes small. As described above, the direct coupling between engine 1 and motor/generator 2 cannot be carried out in a region which is smaller in engine speed $N_E$ than first predetermined speed $N_{E0}$ set approximately to the engine idling speed. Hence, to avoid this region, the vehicle is accelerated with a large positive directional torque developed. The revolution speed $N_{M/G}$ in the positive directional torque is, then, increased in a region from first predetermined engine speed $N_{E0}$ to second predetermined engine speed $N_{E1}$. Thereafter, in a state where engine speed $N_E$ is slightly increased rather than second predetermined speed $N_{E1}$, motor/generator torque is coincident with or substantially coincident with engine torque. At this time, since motor/generator speed $N_{M/G}$ and engine speed $N_E$ are made approximately or completely coincident with each other, it may be possible to accelerate the vehicle with both of engine 1 and motor/generator 2 directly coupled. Such an advantage as setting the map appears well on the timing charts of FIGS. 9D, 9E, and 9F described above.

In addition, since reference motor/generator torque $T^*_{M/G2}$ is set in a feed-forward form using engine speed $N_E$ and opening angle TH of the throttle valve before the vehicle is started and accelerated, namely, before the torsional vibration of the drive system is developed. Therefore, reference motor/generator torque is not susceptible to the torsional vibration of the drive system, the torque and revolution speed of motor/generator are not easy to be vibrated. Therefore, stable vehicular start and acceleration can be expected.

It is noted that there is a possibility that the torsional vibration is developed on the drive shaft according to reference motor/generator torque $T^*_{M/G2}$. Hence, suppose a third motor/generator torque $T^*_{M/G3}$ by which the torsional vibration of the drive shaft caused by reference motor/generator torque $T^*_{M/G2}$ is compensated for. Since the planetary gear mechanism constituting the torque synthesis mechanism in equation (5) is not interposed, gear ratio α is 1 and gear ratio β is 1. Hence, third motor/generator torque $T^*_{M/G3}$ is expressed as equation (6).

$$T^*_{M/G3} = \exp(-\xi\pi/\sqrt{(1-\xi^2)} \cdot T^*_{M/G2}(t-\pi/\sqrt{(1-\xi^2)} \cdot \omega n)) \qquad (6).$$

In equation (6), a coefficient portion multiplied by reference motor/generator torque $T^*_{M/G2}$ constitute proportional element processing section 47 and a portion of a function $T^*_{M/G2(t)}$ of reference motor/generator torque related to the time which is delayed by ½ period constitutes dead time element processing section 48. It is noted that reference motor/generator torque $T^*_{M/G2}$ corresponds to second torque according to the present invention and third motor/generator torque $T^*_{M/G3}$ expressed in equation (6) corresponds to the third torque according to the present invention.

Figure 15A:
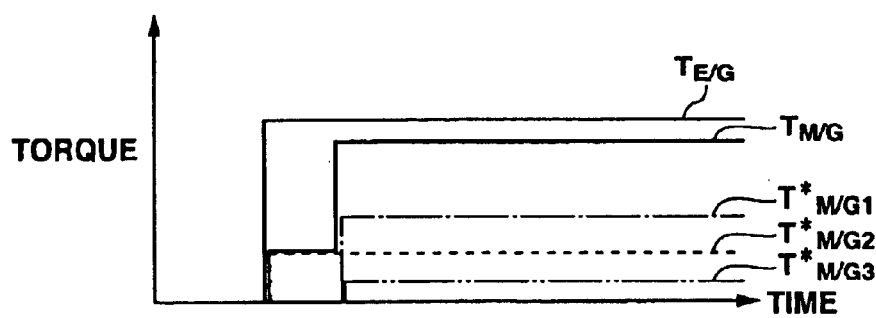
FIGS. 15A and 15B are explanatory views for explaining an operation of the arithmetic processing shown in FIG. 10.
Figure 15B:
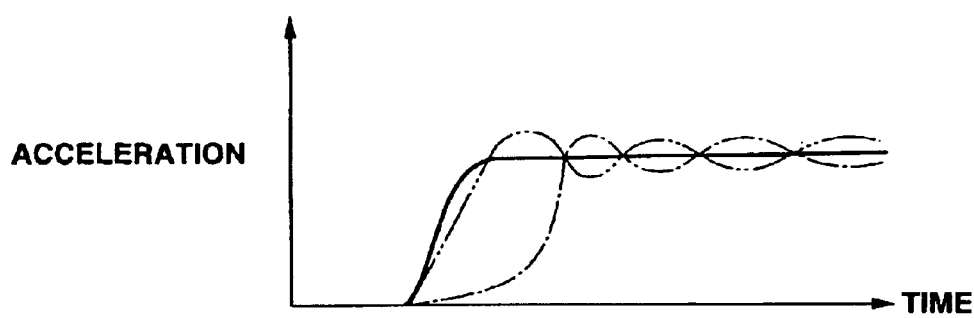
Figure 16:
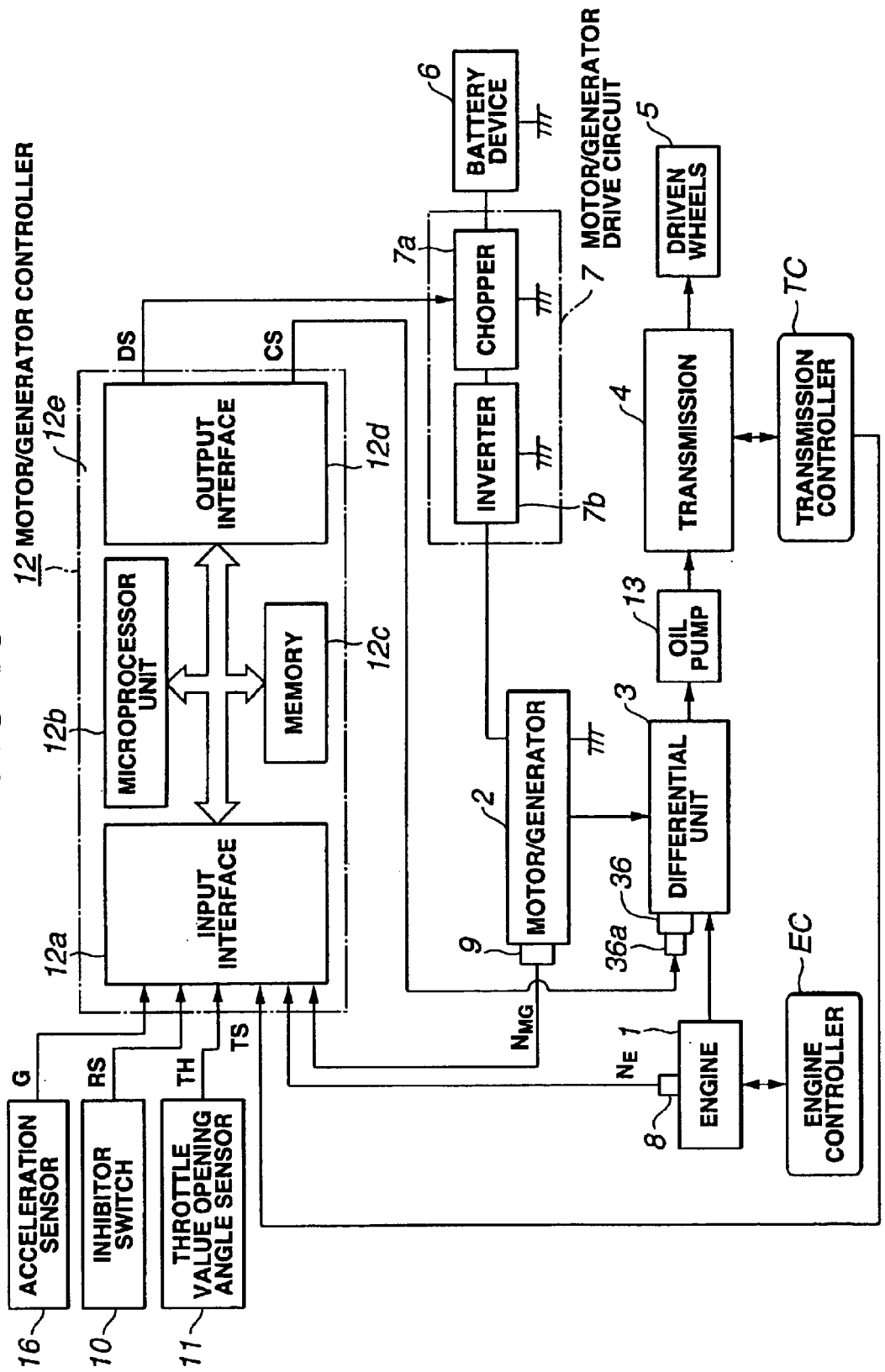
FIG. 16 is a rough configuration view of the parallel hybrid vehicle in a second preferred embodiment according to the present invention.

FIG. 15 shows engine torque $T_{E/G}$ and motor/generator torque $T_{M/G}$ developed according to the arithmetic process shown in the block diagram of FIG. 10 and an acceleration acted upon the vehicle body, namely, the vibration state of the vehicle body of the hybrid vehicle. In the case of a situation shown in FIG. 15, engine torque $T_{E/G}$ rises in a stepwise manner, as shown in FIG. 15. Since engine torque $T_{E/G}$ is in excess of first predetermined engine speed $N_{E0}$ of the control map shown in FIG. 14, reference motor torque calculating section 46 shown in FIG. 10 sets reference motor/generator torque $T^*_{M/G2}$ in accordance with engine speed $N_E$ and opening angle TH of throttle valve, reference motor torque $T^*_{M/G2}$ being developed on motor/generator. Then, first motor/generator torque $T^*_{M/G1}$ which is a multiplication of engine torque $T_{E/G}$ by the proportional element delayed by a half of a specific angular period of the drive system and third motor/generator torque $T^*_{M/G3}$ which is a multiplication of reference motor/generator torque $T^*_{M/G2}$ by the proportional element are simultaneously set and a motor/generator torque $T_{M/G}$ which is an addition of second and third motor/generator torques $T^*_{M/G2}$ and $T^*_{M/G3}$ are developed. Thus, the torsional vibration as denoted by a phantom line in FIG. 16 is developed on the drive shaft only according to engine torque $T_{E/G}$ in the form of acceleration. On the other hand, the torsional vibration as denoted by a dot-and-dash line in FIG. 15B is developed on the drive shaft according to the motor/generator torque $T_{M/G}$, particularly, according to the first motor/generator torque $T^*_{M/G1}$ and third motor/generator torque $T^*_{M/G3}$ in the form of the acceleration. This vibration interferes against the torsional vibration of the drive shaft developed according to engine torque $T_{E/G}$ and cancels with each other. Consequently, a smooth acceleration as denoted by a solid line of FIG. 15B can be achieved. At the same time, the torsional vibration of the drive shaft, namely, the vibration transmitted to the vehicle body is suppressed or prevented from occurring.

On the other hand, specific angular frequency ωn and damping factor ξ are included in dead time elements found in equations (5) and (6). As described above, since specific angular vibration frequency ωn and damping factor ξ are parameters in the dead time element of the drive system of the vehicle, they are varied when the gear ratio is varied. In addition, if inertia Ia of the drive system, damping factor Ca, and spring constant Ka are left varied, they are specific to the respective gear ratios. In the first embodiment, the present gear ratio is detected from a gear shift device signal TS from transmission controller TC. The specific angular frequency ωn and damping factor ξ are modified in accordance with the present gear ratio. By adjusting the dead time element, the accurate predetermined dead time which corresponds to a half of the specific torsional vibration period needs to be accurate. The torsional vibration of the drive shaft can be cancelled with more accurate interference carried out.

Furthermore, since a vehicular body equivalent inertia Iw on the drive shaft contributes on damping constant Ca of the drive system and spring constant Ka thereof, the vehicular body equivalent inertia Iw is proportional to weight W of the vehicle as described above. If weight W of the vehicle is varied, damping factor Ca of the drive system and spring constant Ka thereof are varied and, together with these variations, specific angular frequency ωn and damping factor ξ are also varied which contribute onto the dead time element. Therefore, in the first embodiment, specific angular frequency ωn and damping factor ξ are modified using weight W of the vehicle detected by vehicular weight calculating section and the dead time element is adjusted so that the predetermined dead time corresponding to the half of the specific torsional vibration period of the drive system of the vehicle is made accurate so that a more accurate interference against the torsional vibration on the drive shaft can be made. Consequently, the more accurate cancellation of the torsional vibration can be achieved.

Figure 17:
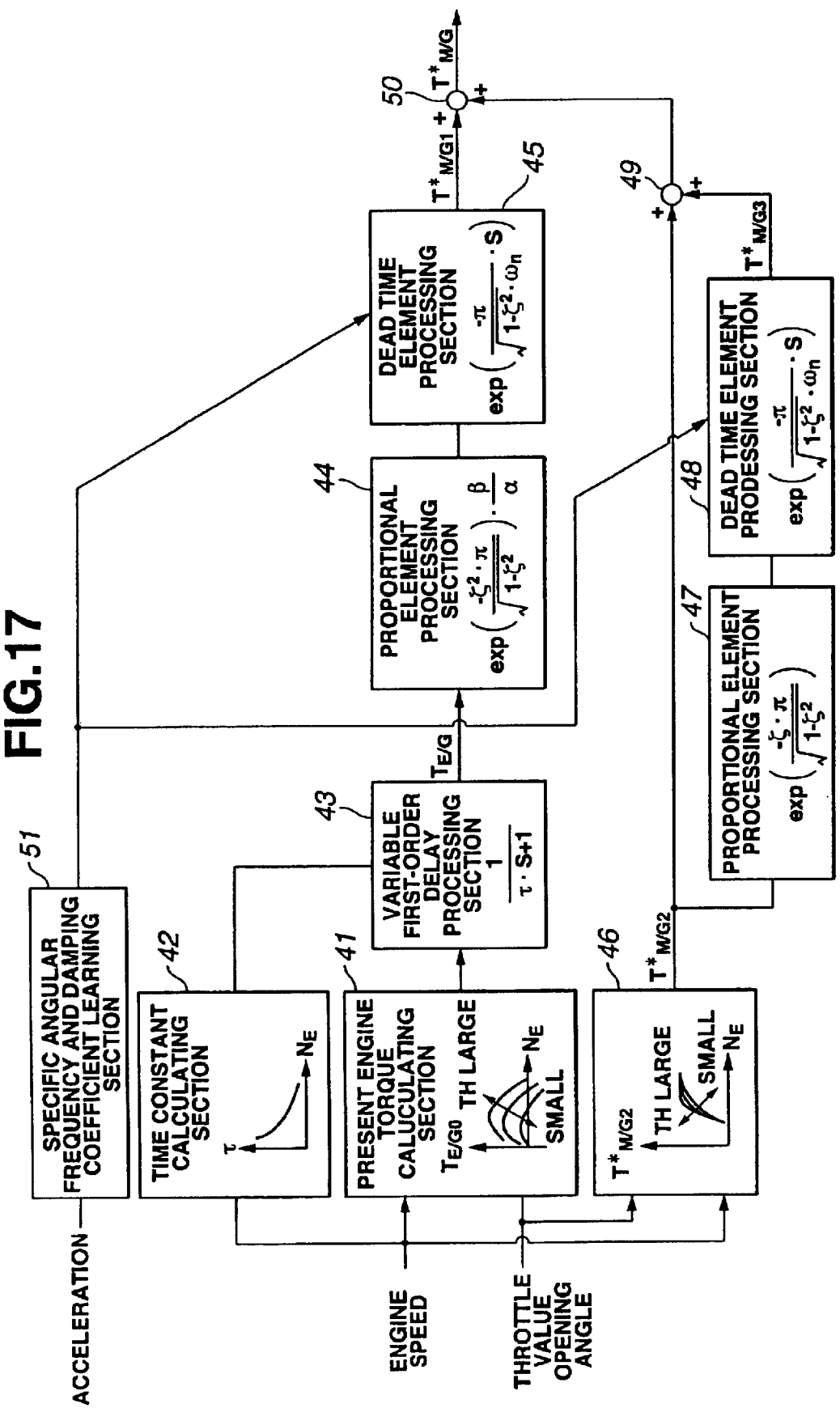
FIG. 17 is a functional block diagram of an arithmetic processing content of the motor/generator controller of the hybrid vehicle shown in FIG. 16.

Next, a second preferred embodiment of the parallel hybrid vehicle according to the present invention will be described below. FIG. 16 shows a system configuration of the hybrid vehicle in the second preferred embodiment. As shown in FIG. 16, an acceleration sensor 16 is disposed on the vehicle to detect an acceleration acted upon the vehicle body, in place of suspension stroke sensor 15 to detect the weight of the vehicle as described in the first embodiment shown in FIG. 1. The other structures of the hybrid vehicle are generally the same as those in the first embodiment. In addition, the arithmetically operational procedure executed in motor/generator controller 12 in the second embodiment is shown in the block diagram of FIG. 17. As shown in FIG. 17, the difference point from that in the first embodiment shown in FIG. 10 is that specific angular frequency and damping factor (coefficient) learning section 51 is newly installed to learn specific angular frequency ωn and damping factor ξ of the drive system, in place of weight calculating section 40 to calculate the weight of the vehicle described in the first embodiment.

Figure 18A:
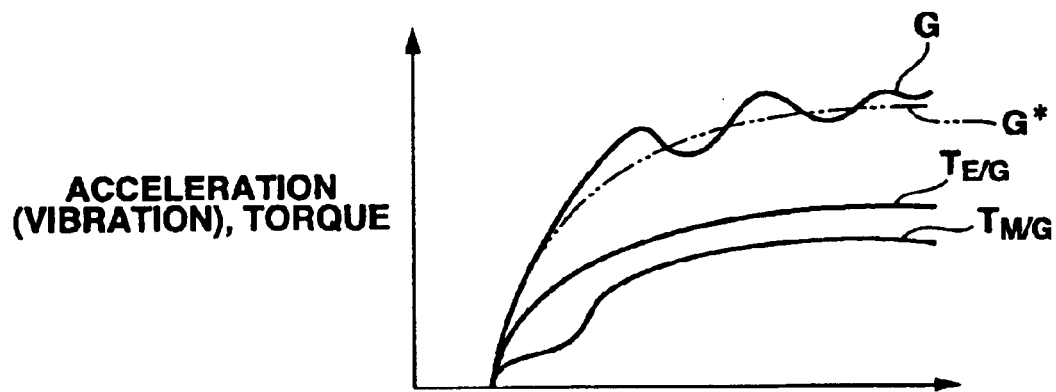
FIGS. 18A and 18B are explanatory views for explaining an action of the arithmetic processing content shown in FIG. 17.
Figure 18B:
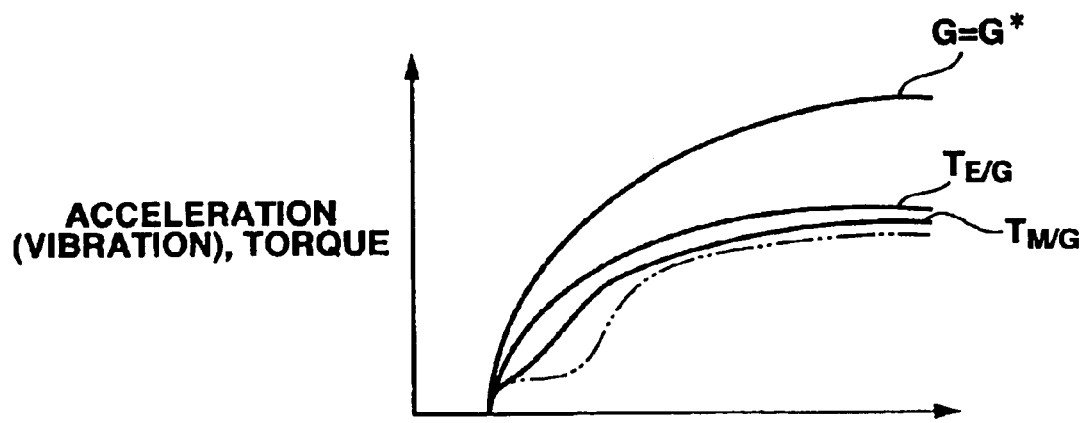

As described above, specific angular frequency ωn of the drive system and damping factor ξ are varied in accordance with, for example, the gear ratio and the weight of the vehicle. In this embodiment, specific angular frequency and damping factor (coefficient) learning section 51 is corrected in accordance with a learning. That is to say, for example, as shown in FIG. 18A, motor/generator torque $T_{M/G}$ against engine torque $T_{E/G}$ is set. As a result of the control over the engine torque and motor/generator torque, acceleration G as denoted by a solid line of FIG. 18A is developed over target acceleration G* which is a target acceleration as denoted by a phantom line shown in FIG. 18A. In a case where the torsional vibration of the drive shaft cannot be suppressed, specific angular vibration ωn and damping factor ξ of the drive system are modified. Furthermore, after the target acceleration G* and detected acceleration G are compared with each other, the above-described modifying procedure is repeated. At a final stage, specific angular frequency ωn and damping factor ξ are learned so that target acceleration G* and detected acceleration G are made completely coincident with or substantially coincident with each other, as shown in FIG. 18B (refer to an uppermost solid line of FIG. 18B).

As described above, specific angular vibration frequency ωn of the drive system and damping factor ξ thereof are learned and corrected to their appropriate values so that the detected vibration state becomes a predetermined vibration state when motor/generator torque $T^*_{M/G1}$ and third motor/generator torque $T^*_{M/G3}$ are calculated and set. The torsional vibration of the drive shaft can accurately be prevented from occurring. It is noted that, in the second embodiment, the torsional vibration is detected according to the detection of the acceleration acted upon the vehicular body. However, the torsional vibration of the drive shaft may be detected from a difference between revolution speeds of an output axle of the transmission 4 and driven wheels 5.

In addition, in each of the preferred embodiments, the microcomputers are used for the respective controllers. However, various kinds of arithmetic process circuits may be used for the respective controllers. It is noted that the position of lock-up clutch 36 is not limited to the position described in the first embodiment but may be interposed between sun gear 2S and pinion carrier 2C or between pinion carrier 2C and ring gear 2R. In addition, a method of linking three elements of the planetary gear mechanism 2 with engine 1, motor/generator 2, and its output is not limited to that described in each of the first and second embodiments.

The entire contents of a Japanese Patent Application No. 2001-239733 (filed in Japan on Aug. 7, 2001) are herein incorporated by reference. The scope of the invention is defined with reference to the following claims.

What is claimed is:

1. A hybrid vehicle, comprising:
   an engine;
   a transmission;
   a motor/generator having both functions of an electric motor and a generator;
   a torque synthesis mechanism that synthesizes output torques of the engine and of the motor/generator;
   a lock-up clutch to directly couple the engine and the motor/generator; and
   a torque controlling section that controls a torque of the motor/generator in such a manner that an engine speed is maintained at a predetermined speed, with the lock-up clutch in a non-clutched state during a start of the vehicle, the torque controlling section comprising: an engine torque calculating section that calculates an engine torque; and a first torque calculating section that calculates a first torque to suppress a torsional vibration developed on a drive shaft according to the calculated engine torque.

2. A hybrid vehicle as claimed in claim 1, wherein the first torque calculating section calculates the first torque according to the calculated engine speed which is a torque to develop a vibration whose amplitude is the same as the torsional vibration developed on the drive shaft and whose phase is 180° out of phase to the torsional vibration.

3. A hybrid vehicle as claimed in claim 1, wherein the torque synthesis mechanism comprises a differential gear unit having a first rotary member that links with the engine, a second rotary member that links with the transmission, and a third rotary member that links with the motor/generator and the first torque calculating section calculates the first torque by delaying the engine torque calculated by the engine torque calculating section by a predetermined dead time and by multiplying the delayed engine torque calculated by the engine torque calculating section with a predetermined coefficient calculated on the basis of at least a gear ratio of the differential gear unit, an inertia of the first rotary member thereof, and an inertia of the third rotary member thereof.

4. A hybrid vehicle as claimed in claim 3, wherein the predetermined dead time corresponds to a half of a vibration period of the torsional vibration specific to a drive system of the vehicle.

5. A hybrid vehicle as claimed in claim 3, wherein the first torque calculating section corrects a parameter of the predetermined dead time according to a transmission gear ratio of the transmission.

6. A hybrid vehicle as claimed in claim 3, wherein the hybrid vehicle further comprises a weight detecting section that detects a weight of the hybrid vehicle and the first torque calculating section corrects a parameter of the predetermined dead time according to the weight of the hybrid vehicle detected by the weight detecting section.

7. A hybrid vehicle as claimed in claim 3, wherein the hybrid vehicle further comprises a torsional vibration detecting section that detects the torsional vibration of the drive shaft and the first torque calculating section adjusts a parameter of the predetermined dead time to make a vibration state detected by the torsional vibration detecting section substantially equal to a predetermined vibration state.

8. A hybrid vehicle as claimed in claim 1, wherein the torque controlling section comprises a third torque calculating section that calculates a third torque to suppress the torsional vibration on the drive shaft developed according to a second torque, the second torque being the output torque of the motor/generator when the torque controlling section controls the second torque of the motor/generator in such a manner that the engine speed is maintained at the predetermined speed during the start of the vehicle.

9. A hybrid vehicle as claimed in claim 8, wherein the third torque calculating section calculates the third torque which is a torque to develop a vibration whose amplitude is the same as the torsional vibration of the drive shaft developed by the second torque and whose phase is 180° out of phase to the torsional vibration of the drive shaft.

10. A hybrid vehicle as claimed in claim 8, wherein the third torque calculating section calculates the third torque by delaying the second torque by a predetermined dead time and by multiplying the delayed second torque with a predetermined coefficient.

11. A hybrid vehicle as claimed in claim 10, wherein the predetermined dead time corresponds to a half of a vibration period of the torsional vibration specific to a drive system of the vehicle.

12. A hybrid vehicle as claimed in claim 10, wherein the third torque calculating section corrects a parameter of the predetermined dead time in accordance with a transmission gear ratio of the transmission.

13. A hybrid vehicle as claimed in claim 10, wherein the hybrid vehicle comprises a weight detecting section that detects a weight of the hybrid vehicle and the third torque calculating section corrects a parameter of the predetermined dead time in accordance with the weight of the hybrid vehicle detected by the weight detecting section.

14. A hybrid vehicle as claimed in claim 10, wherein the hybrid vehicle comprises a vibration detecting section that detects the torsional vibration on the drive shaft and the third torque calculating section adjusts a parameter of the predetermined dead time in such a manner that the vibration state detected by the vibration detecting section falls in a predetermined vibration state.

15. A hybrid vehicle as claimed in claim 12, wherein the parameter of the predetermined dead time includes at least one of a specific angular vibration frequency $\omega n$ of the drive system of the vehicle and a damping factor $\xi$ thereof.

16. A hybrid vehicle as claimed in claim 1, wherein the engine torque calculating section comprises: an engine speed detecting section that detects the engine speed $N_E$; a throttle opening angle detecting section that detects an opening angle TH of an engine throttle valve; an engine map torque calculating section that calculates an engine map torque $T_{E/G0}$ from the engine speed detected by the engine speed detecting section and the opening angle TH of the engine throttle valve detected by the throttle opening angle detecting section; a time constant calculating section that calculates a time constant $\tau$ from the engine speed detected by the engine speed detecting section; and a variable first-order delay processing section that executes a variable first-order delay using the time constant τ calculated by the time constant calculating section for the engine map torque $T_{E/G0}$ calculated by the engine map torque calculating section to calculate the engine torque $T_{E/G}$ presently inputted to a drive system of the vehicle.

17. A hybrid vehicle as claimed in claim 16, wherein the first torque calculating section further comprises: a proportional element processing section that executes a proportional element process for the engine torque $T_{E/G}$ calculated by the variable first-order delay processing section; and a vehicular weight detecting section that detects a weight of the hybrid vehicle; and a dead time element processing section that executes a dead time element process using a transmission gear ratio and the weight of the vehicle detected by the vehicular weight detecting section for a value calculated by the proportional element processing section to calculate a fist motor/generator torque $T^*_{M/G1}$ which corresponds to the first torque.

18. A hybrid vehicle as claimed in claim 17, wherein the first motor/generator torque $T^*_{M/G1}=\exp(-\xi\pi/\sqrt{(1-\xi^2)}\cdot\beta/\alpha\cdot T_{E/G}(t-\pi/\sqrt{(1-\xi^2)}\cdot\omega n))$, wherein $\omega n=\sqrt{Ka/Ia}$, $\xi=1/2\cdot Ca/\sqrt{(Ia\cdot Ka)}$, $Ia=R\{(1+\alpha)/\alpha\cdot\beta\cdot I_{E/G}+(\beta+\alpha^2)/\alpha(1+\alpha)\cdot I_{CRR}\}$, $Ca=C\{R\cdot(1+\alpha)/\alpha\cdot\beta\cdot I_{E/G}/I_W+(\beta+\alpha^2)/\alpha(1+\alpha)\cdot(R\cdot I_{CRR}/I_W+1/R)\}$, $Ka=K\{R\cdot(1+\alpha)/\alpha\cdot\beta\cdot I_{E/G}/I_W+(\beta+\alpha^2)/\alpha(1+\alpha)\cdot(R\cdot I_{CRR}/I_W+1/R)\}$, $\beta=I_{M/G}/I_{E/G}$, α denotes a gear ratio of the torque synthesis mechanism, $I_{M/G}$ denotes an inertia of the motor/generator, $I_{E/G}$ denotes an inertia of the engine, $I_{CRR}$ denotes an inertia of the drive system after the transmission, K denotes a spring constant of the drive shaft, C denotes a damping constant of the drive shaft, and Iw denotes an equivalent inertia of a vehicle body on the drive shaft.

19. A hybrid vehicle as claimed in claim 17, wherein the torque controlling section further comprises a reference motor/generator torque calculating section that calculates a reference motor/generator torque $T^*_{M/G2}$ corresponding to a second motor/generator torque on the basis of the engine speed $N_E$ and the opening angle TH of the engine throttle valve; another proportional element processing section that executes another proportional element process for the reference motor/generator torque $T^*_{M/G2}$ calculated by the reference motor/generator torque calculating section; and another dead time element processing section that executes another dead time element process using the transmission gear ratio and the vehicular weight of the vehicle detected by the vehicular weight detecting section for a value calculated by the other proportional element processing section to calculate a third motor/generator torque $T^*_{M/G3}$, the third motor/generator torque being a torque to suppress the torsional vibration developed on the drive shaft according to the second motor/generator torque $T^*_{M/G2}$.

20. A hybrid vehicle comprising:
an engine;
a transmission;
a motor/generator having both functions of an electric motor and a generator; and
a controlling section that controls the engine and the motor/generator, a torque from the engine and the motor/generator being transmitted to driven wheels via a transmission and a drive shaft, the controlling section comprising: an engine torque calculating section that calculates an engine torque and a torsional vibration suppression torque calculating section that calculates a torsional vibration suppression torque to suppress a torsional vibration developed on the drive shaft according to the engine torque calculated by the engine torque calculating section, the torsional vibration suppression torque calculated by the torsional vibration suppression torque calculating section being outputted from the motor/generator.

* * * * *